C. A. SCHINDLER.
SIGNALING DEVICE.
APPLICATION FILED FEB. 6, 1911.
1,015,715.
Patented Jan. 23, 1912.
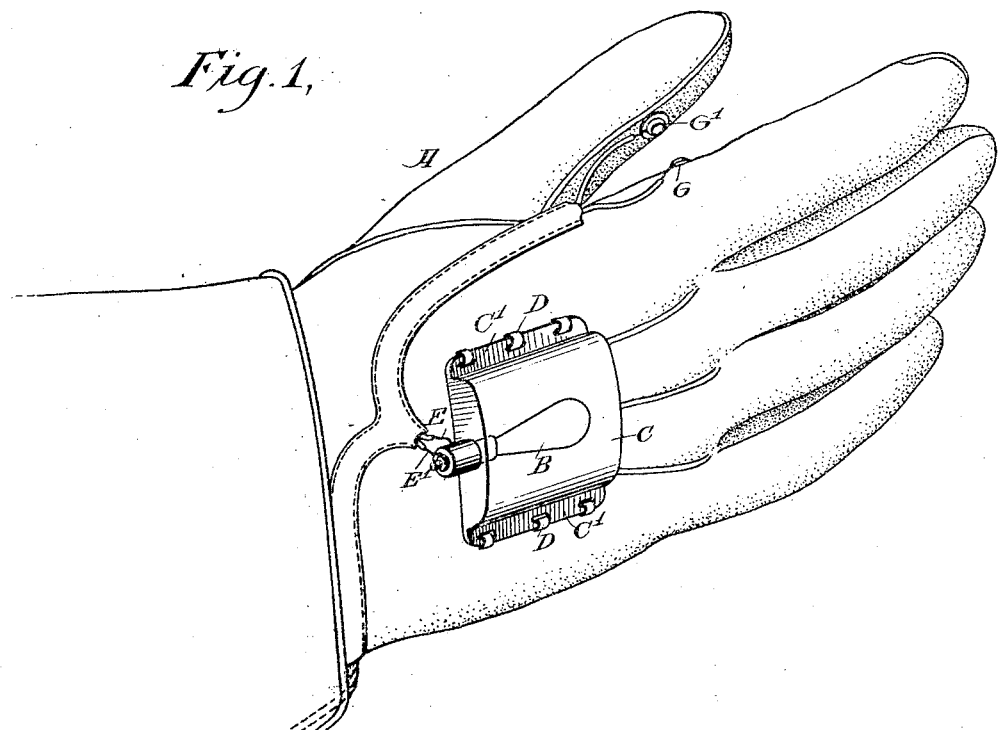
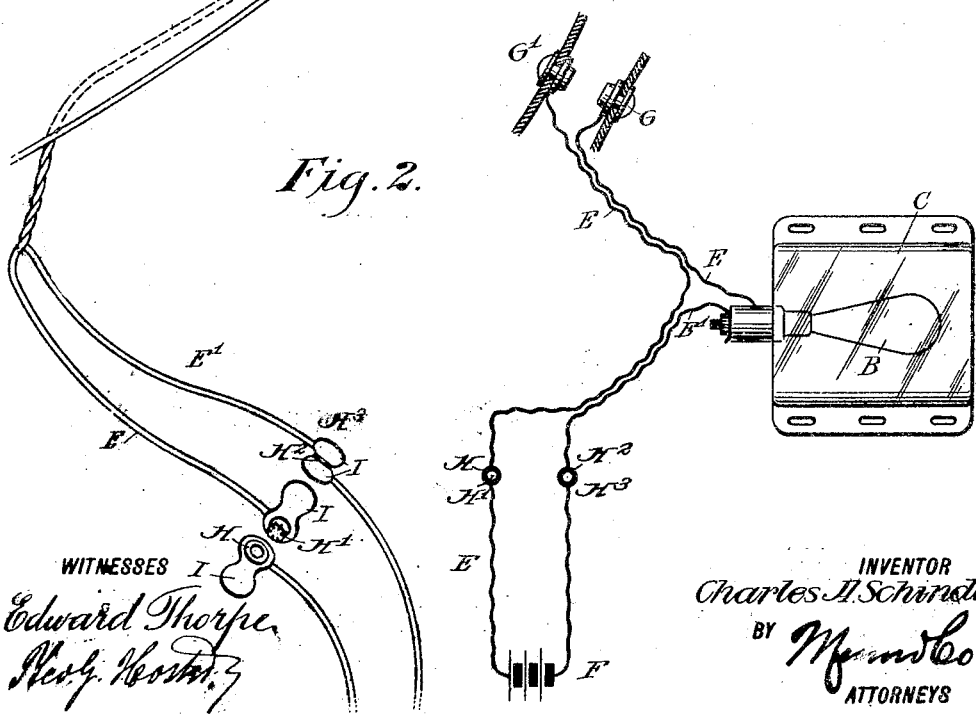
WITNESSES
Edward Thorpe
Geo. Hosking
INVENTOR
Charles A. Schindler
BY Munn & Co.
ATTORNEYS

UNITED STATES PATENT OFFICE.

CHARLES A. SCHINDLER, OF WEST HOBOKEN, NEW JERSEY.

SIGNALING DEVICE.

1,015,715. Specification of Letters Patent. Patented Jan. 23, 1912.

Application filed February 6, 1911. Serial No. 606,683.

*To all whom it may concern:*

Be it known that I, CHARLES A. SCHINDLER, a citizen of the United States, and a resident of West Hoboken, in the county of Hudson and State of New Jersey, have invented a new and Improved Signaling Device, of which the following is a full, clear, and exact description.

The invention relates to signaling devices, such as are used on automobiles and other power-driven vehicles, for displaying during the night to a following vehicle a danger signal whenever it is desired to turn out of the direction in which the vehicle is traveling or for other purposes.

The object of the invention is to provide a new and improved signaling device, arranged on a glove or other garment worn by the driver of an automobile, and arranged in such a manner that the signal can be readily displayed during the night whenever it is desired to turn out or to stop the vehicle, or for other purposes.

Use is preferably made of an electric signaling lamp carried on the glove, or other part of the wearing apparel of the driver, and an electric circuit connected with the electric lamp, and having a switch provided with contact points, controlled by the driver's fingers, to open and close the circuit whenever it is desired to do so.

A practical embodiment of the invention is represented in the accompanying drawings forming a part of this specification, in which similar characters of reference indicate corresponding parts in both views.

Figure 1 is a perspective view of the signaling device as applied to a glove to be worn by the driver of the automobile or other power-driven vehicle; and Fig. 2 is a diagrammatic view of the signaling device.

On the back of the glove A is arranged a small electric lamp, the filament B of which extends within a flat glass bulb C having side flanges C' provided with apertures for engagement by laces D or other fastening means, to securely fasten the bulb C in position on the back of the glove A. The electric lamp is connected by circuit wires E, E' with a source of electrical energy F, which may be in the form of a separate battery, stored in the vehicle, or in the form of the source of electrical energy used for the ignition of other devices of the motor employed for propelling the vehicle. In one of the circuit wires E or E' (as shown the circuit wire E) is arranged a switch in the form of two metallic contacts G, G', in the form of rivets or the like, secured to the glove A, preferably at adjacent fingers, such, for instance, as the thumb and the forefinger, as plainly indicated in Fig. 1, the contacts G, G', being arranged opposite each other so that the driver on moving the fingers toward each other can readily bring the contacts G and G' in contact with each other to close the circuit and thus cause the electric lamp to burn and thereby give a signal at the time the hand wearing the glove A is stretched out at one side of the vehicle. Thus the driver of a following vehicle can readily see the danger signal and take action accordingly. The circuit wires E and E' are provided a short distance from the glove A with a pair of detachable members H, H' and H², H³, in the form of buttons of the ball and socket type, each ball and each socket having a tab of leather or a like material I to permit the driver to readily disconnect the balls and sockets to completely disconnect the electric lamp from the source of electrical energy and thereby permit the driver to wear the glove when leaving the vehicle. On the return of the driver the members H, H' and H², H³ can be readily connected again with each other, so that the signaling device is in operative position, that is, the signal can be displayed whenever it is desired and on moving the contacts G and G' in engagement one with the other.

The device is very simple and durable in construction and can be readily applied to the glove or other garment worn by the driver of the automobile or other vehicle.

Having thus described my invention, I claim as new and desire to secure by Letters Patent:

1. In combination with a glove, of an electric lamp comprising a substantially flat transparent bulb having apertures whereby it may be attached to the glove, circuit wires connected with the said electric lamp, contacts for the said circuit wires mounted opposite each other on adjacent fingers of the glove, and pairs of detachable members in the said circuit wires for completely disconnecting the electric lamp from the source of electrical energy.

2. In combination with a glove, of an electric lamp comprising a substantially flat transparent bulb having apertures whereby it may be attached to the glove, circuit wires connected with the said electric lamp, contacts for the said circuit wires mounted opposite each other on adjacent fingers of the glove, and pairs of detachable members in the said circuit wires for completely disconnecting the electric lamp from the source of electrical energy, each member having tabs for pulling the members of a pair apart.

In testimony whereof I have signed my name to this specification in the presence of two subscribing witnesses.

CHARLES A. SCHINDLER.

Witnesses:
THEO. G. HOSTER,
PHILIP D. ROLLHAUS.